United States Patent [19]

Satoh

[11] Patent Number: 4,754,938
[45] Date of Patent: Jul. 5, 1988

[54] MAGNETIC TAPE CASSETTE
[75] Inventor: Takateru Satoh, Nagano, Japan
[73] Assignee: TDK Corporation, Japan
[21] Appl. No.: 914,131
[22] Filed: Oct. 1, 1986
[30] Foreign Application Priority Data
  Oct. 1, 1985 [JP] Japan ............................ 60-150472[U]
[51] Int. Cl.[4] .......................................... G11B 23/087
[52] U.S. Cl. .................................................... 242/199
[58] Field of Search .............................. 242/197–200, 242/194; 360/93, 96.1, 132, 130.33

[56] References Cited
U.S. PATENT DOCUMENTS 4,267,986  5/1981  Vemura et al. ...................... 242/199
4,330,068  5/1982  Shoji ............................... 242/199 X
4,506,846  3/1985  Gelardi et al. ...................... 242/199

Primary Examiner—John M. Jillions
Attorney, Agent, or Firm—Steinberg & Raskin

[57] ABSTRACT

A magnetic tape cassette comprising a pair of top and bottom cover plates having substantially the same construction, an intermediate frame arranged between the two cover plates, and a tape guide block arranged between the two cover plates in their front portions. The tape guide block is provided with pairs of tape guide members such as pins on both sides of a head, with a coefficient of friction of the pair of guide members near the head being smaller than that of the pair of guide members away from the head. The tape guide block is accurately aligned with the two cover plates.

5 Claims, 3 Drawing Sheets

MAGNETIC TAPE CASSETTE

BACKGROUND OF THE INVENTION

The present invention relates to a magnetic tape cassette and, more particularly, to a magnetic tape cassette having a tape guide block which is arranged between top and bottom cover plates for guiding a tape along an open front of the tape cassette.

A conventional magnetic tape cassette is usually formed by a two-piece plastic case that is assembled by joining top and bottom half cases of substantially the same configurations, which are made of molded plastic material. However, such plastic half cases having rather complicated configurations tend to warp due to thermal deformations and molding strains of the plastic material. Accordingly, such an assembled case often has problems, such as an irregular tape run and an off-track or out-of-phase recording or playing, in the tape cassette.

In order to remove these problems, to prevent the warping of the cassette case, to improve the acoustic performance of the tape cassette and to increase the mechanical strength of the case, a three-piece cassette case has been proposed in U.S. Pat. Nos. 4,267,986 (Uemura et al.) and 4,330,068 (Shoji), assigned to the same assignee as this application.

However, in the proposed cassette cases comprising top and bottom cover plates and an intermediate frame inserted therebetween, the intermediate frame having a thin rectangular ring form is provided with a plurality of projections on its front for guiding a tape. Hence, the intermediate frame functions not only as a frame but also as a tape guide. As a result of its function as a frame, both prevention of the deformation of the case and an increase in the mechanical stregth and weight of the case may be attained. Further, it has been proven that such an increase in the weight of the case prevents unnecessary resonance or vibration, thus resulting in better acoustic performance.

As a result of its function as a tape guide, a proper friction is imparted between the running tape and the contact surface of the tape guide part, which is essential for properly determining the shape of the tape guide part and increasing the dimensional accuracy of the tape guide part.

In the prior art, the intermediate frame is required to function both as a frame as well as a tape guide, but the functions of these two members sometimes contradict each other. In other words, in this case, the combined functioning as the frame and as the tape guide can only be attained to a limited degree or by conflict with one another at the same time.

In U.S. Pat. No. 4,506,846 (Gelardi et al.), a tape cassette comprising top and bottom plastic half cases and a separate tape guide for guiding a tape along the open front of the tape cassette is disclosed. In this case, the tape guide is made in a simple form so as to attain an improvement of the dimensional accuracy of the tape guide part. However, since the cassette case is mainly composed of the top and the bottom plastic cases, there are problems in the functioning of the frame even when the tape guide is functioning very well. For instance, the insufficient mechanical strength of the case may cause it to bend. Further, the insufficient weight of the case is liable to cause unnecessary resonance or vibration, thus giving rise to acoustic performance problems.

Further, as described above, in the function as a tape guide, it is necessary to impart proper friction to the running tape from the contact surface of the tape guide part. However, in the tape guides disclosed in the aforementioned U.S. patents, it is very difficult to impart proper friction to the running tape in the tape guide part. Accordingly, in the tape insertion part of the tape cassette of the prior art, an irregular tape run occurs and thus the tape cannot travel smoothly in the tape guide part. Hence, an unclear sound phenomenon in the frequency modulation or the modulation noise often occurs.

SUMMARY OF THE INVENTION

Accordingly, it is an object of the present invention to provide a tape guide block and a magnetic tape cassette having such a tape guide block, which are free from the aforementioned defects and disadvantages, have good tape running stability and excellent acoustic performance, and which are capable of preventing occurrences of irregular tape run and off-track or out-of-phase recording or playing, the cassette having both a frame and a tape guide that function in a superior fashion.

In accordance with one aspect of the invention, there is provided a tape guide block for guiding a magnetic tape along an open front portion of a magnetic tape cassette, comprising an elongated member having front and rear surfaces and substantially planar upper and lower surfaces which are substantially parallel to each other, and including a head insertion part formed substantially at the center portion of the front surface, a pair of positioning holes formed substantially perpendicularly to the upper and lower surfaces on the left and right sides (i.e. the lateral sides) of the head insertion part, first guide member holding means formed near the head insertion part on the left and right (lateral) sides of the positioning holes, second guide member holding means formed far from the head insertion part on left and right (lateral) sides of the positioning holes, and pairs of first and second guide members to be directly contacted by the magnetic tape and which are held substantially perpendicularly to the upper and lower surfaces of the elongated member by the respective first and second guide member holding means, wherein a coefficient of friction of the first guide members is smaller than that of the second guide members.

In accordance with another aspect of the invention, there is provided a magnetic tape cassette comprising a top cover plate having front, left and right side and rear portions; a bottom cover plate, having substantially the same construction as the top cover plate and having front, left and right side and rear portions; an intermediate frame arranged between the top and the bottom cover plates and having front, left and right side and rear portions corresponding to those of the top and the bottom cover plates; and a tape guide block for guiding a tape along an open front of the magnetic tape cassette, which is arranged between the top and the bottom cover plates at the front portions thereof, comprising an elongated member having front and rear surfaces and substantially planar upper and lower surfaces which are substantially parallel to each other, and including a head insertion part formed substantially at the center portion of the front surface, a pair of positioning holes formed substantially perpendicularly to the upper and lower surfaces on the left and right (lateral) sides of the head insertion part, first guide member holding means formed near the head insertion part on the left and right (lateral) sides of the positioning holes, second guide member holding means formed far from the head insertion part on the left and right (lateral) sides of the positioning holes, and pairs of first and second guide members to be directly contacted by the magnetic tape, which are held substantially perpendicularly to the upper and lower surfaces of the elongated member by the respective first and second guide member holding means, wherein a coefficient of friction of the first guide members is smaller than that of the second guide members.

In a preferred embodiment of the invention, the tape guide block is formed separate from the top and the bottom cover plates and the intermediate frame, and is made of a synthetic resin material, with the intermediate frame being made of a metallic material.

In another preferred embodiment of the invention, each of the first and the second guide member holding means comprise a pair of upper and lower bifurcated guide projections formed on the front surface of the tape guide block.

In further preferred embodiment of the invention, each of the first guide members comprises a pin made of a metallic material and each of the second guide members comprises a pin made of a synthetic resin material.

BRIEF DESCRIPTION OF THE DRAWINGS

Other and further objects, features and advantages of the invention will appear more fully from the following description of the preferred embodiments thereof taken in connection with the accompanying drawings, in which.

DESCRIPTION OF THE PREFERRED EMBODIMENTS

Figure 1:
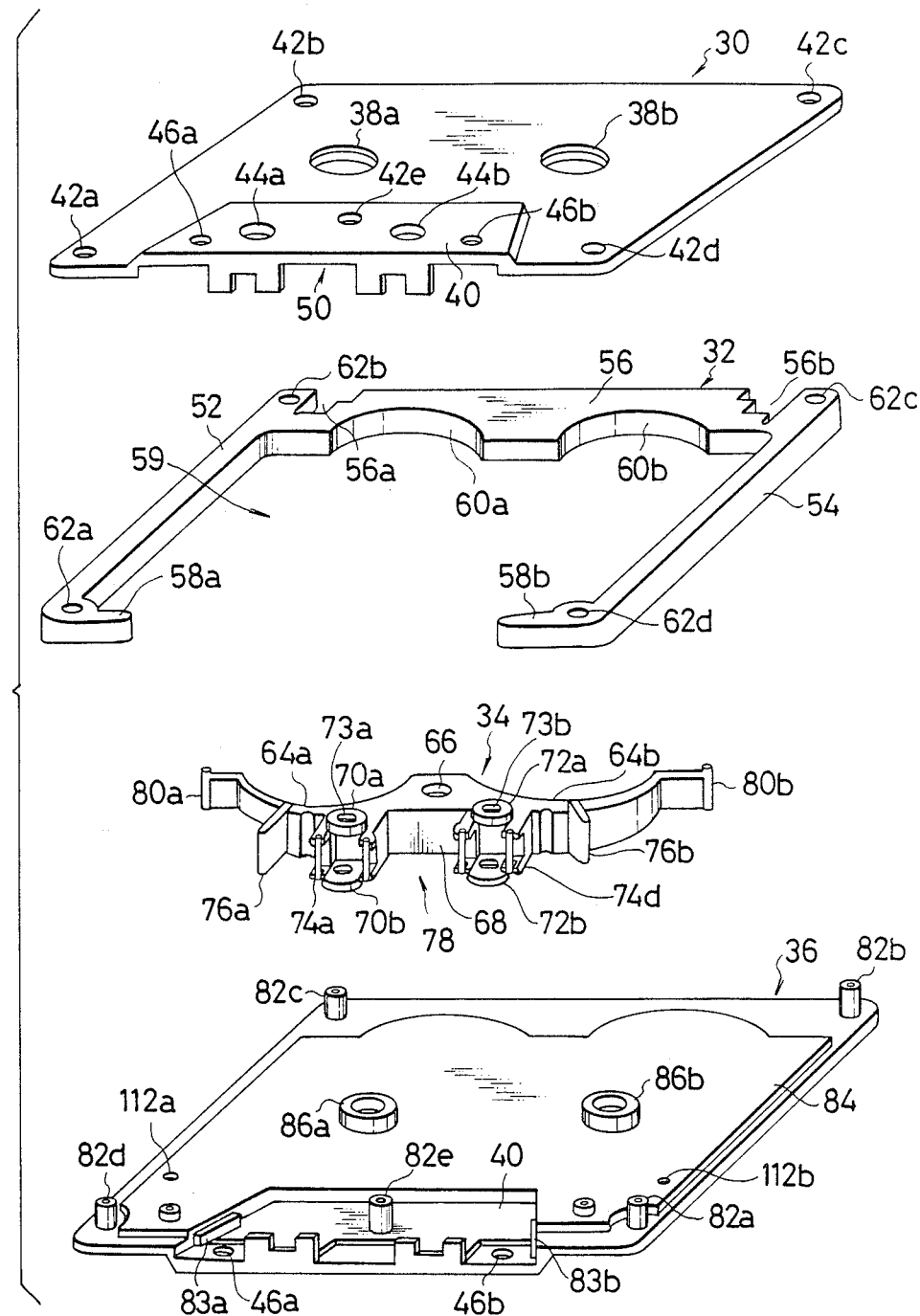
FIG. 1 is an exploded perspective view of a case of a magnetic tape cassette according to the present invention.
Figure 2A:
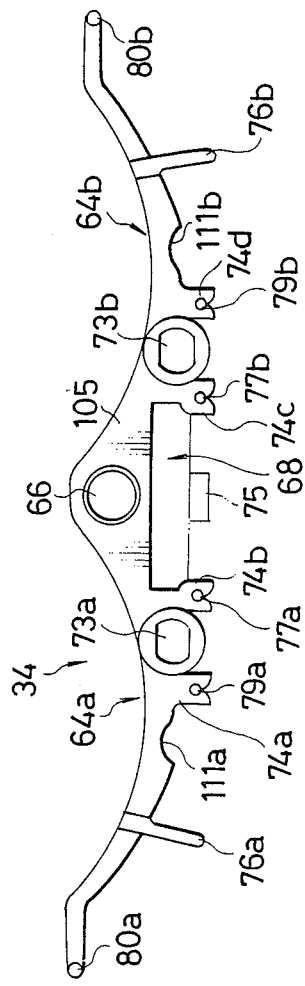
FIG. 2a is a top plan view of a guide block shown in FIG. 1.
Figure 2B:
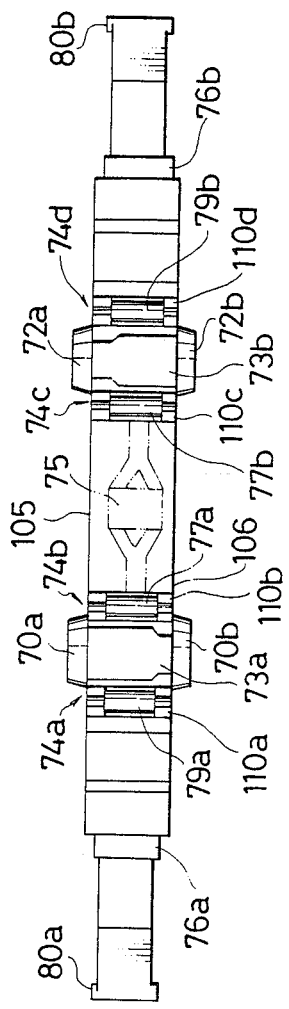
FIG. 2b is a front view of the same.

Referring to the drawings, wherein like reference numerals designate similar or corresponding components throughout the different figures, there is shown in FIGS. 1-3 a magnetic tape cassette having a tape guide block according to the present invention.

In the drawings, numerals 30, 32, 34 and 36 denote a top cover plate, an intermediate frame, a guide block and a bottom cover plate, respectively. The top and the bottom cover plates 30 and 36 have substantially the same constructions, except for minor differences as hereinafter described, e.g., rectangular and approximately flat plate forms made of plastic material such as transparent molded material. The top and the bottom cover plates 30 and 36 are substantially the same size as those of conventional products. The intermediate frame 32 has roughly a rectangular form and its front is cut out. The intermediate frame 32 is a support frame made of a metal by die casting and having upper and lower surfaces which are flat and substantially parallel to each other. The guide block 34 having an elongated bow shape made of a molded plastic, is inserted between the top and the bottom cover plates 30 and 36 and is fitted in the cutout front of the intermediate frame 32. These four members, the top and the bottom cover plates 30 and 36, the intermediate frame 32 and the guide block 34, are assembled in order to form a four-piece cassette case, in which a tape containing part 59 for containing a magnetic tape and a head insertion part 78 where the magnetic tape and the head are contacted with each other, are formed.

The top plate 30 is provided with a pair of holes 38a and 38b formed in spaced relation substantially in the center thereof to receive shafts for driving tape hubs, the bottom plate 36 being provided with a pair of holes in the same manner. An elevated area or a bulge 40 is formed in the central front portion of the upper surface of the top cover plate 30 and the lower surface of the bottom cover plates 36. Five screw holes 42a-42e are formed in the four corners of the top cover plate 30 and a central portion of the bulge 40 for fastening the top cover plate 30 and the three other members 32, 34 and 36 together. The bulge 40 of the top cover plate 30 or of the bottom cover plate 36 is provided with a pair of guide pin holes 44a and 44b for aligning and matching the tape cassette onto a tape player/recorder, and a pair of capstan holes 46a and 46b. The bulge 40 is formed in its central front end portion with a window 50 to be associated with the tape head, guides and the magnetic tape.

The intermediate frame 32 comprises left and right short side portions 52 and 54, a rear long side portion 56 and a pair of left and right front side protions 58a and 58b while the central front side portion is cut out, thus providing a space 59 for holding a reel of magnetic tape. The short and long side portions 52, 54, 56, 58a and 58b of the intermediate frame 32 extend with both upper and lower surfaces in substantially parallel planes. Near the left and right rear corners, a pair of recesses 56a and 56b for avoiding unintentional erasing of the tape's recorded program or information are formed in the outer rear end portions of the rear long side portion 56. A pair of arc cutouts 60a and 60b, which are substantially symmetrical to the left and the right hand sides, are formed on the inner surface of the rear long side portion 56. All corners of the intermediate frame 32 are also provided with holes 62a-62d corresponding to the screw holes 42a-42d of the top cover plate 30.

The guide block 34 having upper and lower flat surfaces 105 and 106 extending in parallel planes is inserted between the bulges 40 of the top and the bottom cover plates 30 and 36. A pair of left and right ends 80a and 80b of the guide block 34 extend in the left and the right short side directions respectively, near the left and the right short side portions 52 and 54 of the intermediate frame 32, thereby defining left and right guide slits 107 and 108 between the left and the right side portions 52 and 54 and the left and the right ends 80a and 80b respectively.

Figure 3A:
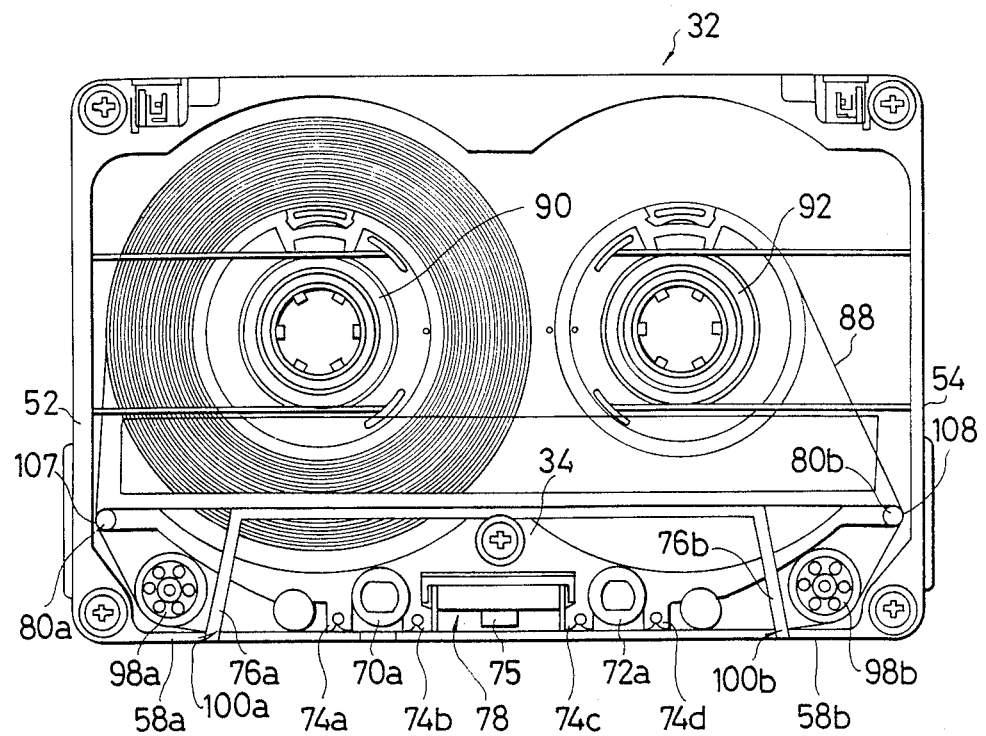
FIG. 3a is a top plan view of a magnetic tape cassette according to the present invention.

The guide block 34 is so fitted in the cutout front portion of the intermediate frame 32 to essentially close the central cutout portion between the front side portions 58a and 58b from the inside, as shown in FIG. 3a. The guide block 34 is also provided with a pair of arc concave portions 64a and 64b symmetrically to the left and right in its inner surface. The arc cutouts 60a and 60b of the intermediate frame 32 and the arc concave portions 64a and 64b of the guide block 34 substantially define the outer peripheries of the reels for winding the tape.

The guide block 34 is formed with a through hole 66 in a central thick walled part thereof corresponding to the hole 42e of the bulge 40 of the top cover plate 30.

The central thick walled part of the guide block 34 is provided with a recess part 68 for mounting a pressure pad 75 in its front end (head insertion part 78) and on both left and right sides of the recess part 68, pairs of upper and lower ring members 70a and 70b, and 72a and 72b are disposed. In left and right through holes 73a and 73b of the ring members 70a, 70b and 72a, 72b, a pair of locating guide pins (not shown) of an external tape player/recorder are inserted. The through holes 73a and 73b are standardized, and thus by inserting the guide pins into the through holes 73a and 73b, the tape cassette may be exactly aligned in the predetermined position of the tape player/recorder.

The guide block 34 is provided with first guide member holding means 74b, 74c formed near the head insertion part 78 on respective left and right (lateral) sides of the positioning holes 73a, 73b (i.e. between the head insertion part 78 and the positioning holes 73a, 73b), and second guide member holding means 74a, 74d formed far from the head insertion part 78 on left and right (lateral) sides of the positioning holes 73a, 73b (i.e. with the positioning holes 73a, 73b between the holding means 74a, 74d and the head insertion part 78). More particularly, the first and second guide member holding means are composed of pairs of tape guide parts 74a and 74b, and 74c and 74d on both sides of the ring members 70a, 70b and 72a, 72b each being composed of pairs of four bifurcated guide projections 110a, 110b, 110c and 110d with four guide members such as guide pins 79a, 77a, 77b and 79b pressed into the respective bifurcated guide projections, the tape directly contacting the four pins. In this condition, the upper and the lower ends of each guide pin are pressed into the pair of bifurcated guide projections of the tape guide part, and the guide pin is held by the elasticity of the plastic forming the tape guide part.

In this embodiment, coefficient of friction of the inside guide pins 77a and 77b is smaller than that of the outside guide pins 79a and 79b, because near the head, the friction imparted from the guide pin to the tape should be small in order to prevent irregular tape travel, while far from the head, the friction imparted from the guide pin to the tape should be large in order to move the tape smoothly. Hence, the inside guide pins 77a and 77b are made of a metallic material such as stainless steel, aluminum, and alloys thereof, and the outside guide pins 79a and 79b are made of a synthetic resin material such as polyamide, polyacetal, ABS and polystyrene. A ceramic pin may be used instead of these pins. Accordingly, the friction imparted to the tape may be properly selected with reference to the head by selecting the materials of the inside and the outside guide pins according to the present invention.

The guide block 34 is also provided with a pair of grooves 111a and 111b having an arc section in the left and right outer sides of the tape guide parts 74a and 74d so as to receive capstans, and a pair of side tape guide projections 76a and 76b in the intermediate portions between the tape guide parts 74a and 74d and the left and the right ends 80a and 80b respectively. Between the ends of the front side portions 58a and 58b of the intermediate frame 32 and the side tape guide projections 76a and 76b of the guide block 34, a pair of slits 100a and 100b are formed, through which the tape passes, as shown in FIG. 3a.

The left and the right ends 80a and 80b of the guide block 34 function as tape guide projections, and upper and lower projections of the ends 80a and 80b are inserted in small holes 112a and 112b formed in the flat surfaces of the top and the bottom cover plates 30 and 36, as shown in FIG. 1. The guide block 34 is securely held by the top and the bottom cover plates 30 and 36 through the hole 66 in its center, the side tape guide projections 76a and 76b on its sides, and the ends 80a and 80b.

The bottom cover plate 36 has substantially the same construction as the top cover plate 30, except that five cylinders 82a–82e surrounding the edges of the holes 42a–42e at its four corners and in the central portion of its bulge 40 extend inside or upwardly greater than the cylinders of the top cover plate 30. When assembling the top and the bottom cover plates 30 and 36, the intermediate frame 32 and the guide block 34 to form a four-piece cassette case, the cylindrical projections 82a–82e of the bottom cover plate 36 are inserted into the holes 62a–62d of the intermediate frame 32 and the hole 66 of the guide block 34 for guiding and aligning those members with one another as well as securely connecting those members.

The bottom cover plate 36 is provided with a pair of left and right support pieces 83a and 83b attached on left and right inner side walls of the bulge 40, for supporting the left and the right side tape guide projections 76a and 76b of the guide block 34. The top cover plate 30 is also provided with support pieces in the same manner as the bottom cover plate 36. The bottom cover plate 36 is formed with a land 84 corresponding in shape to the central space of the intermediate frame 32 and the top cover plate 30 also has a land 84 in the same manner as the bottom cover plate 36. The bottom cover plate 36 is also formed with a pair of holes corresponding in position to the holes 38a and 38b of the top cover plate 30 to receive the shafts for driving the tape hubs and with a pair of annular collars 86a and 86b surrounding the pair of holes, the hub of the tape reel being loosely inserted into each of annular collars 86a and 86b. The top cover plate 30 is also formed with a pair of annular collars surrounding the pair of holes 38a and 38b. The bulge 40 of the bottom cover plate 36 is substantially reverse in configuration to the bulge 40 of the top cover plate 30, and its exterior structure is substantially identical with that of the top cover plate 30.

The precise aligning and matching of the guide block 34 between the top and the bottom cover plates 30 and 36 will now be described as follows. First, the position of the support hole 66 of the guide block 34 is located, and then the cylindrical projections surrounding the holes 42e of the bulges 40 of the top and the bottom cover plates 30 and 36 are fitted into the hole 66 of the guide block 34 from its upper and lower openings while the upper and the lower surfaces of the two side tape guide projections 76a and 76b are supported by the support pieces 83a and 83b of the bulges 40 of the two cover plates 30 and 36 and, at the same time, the upper and the lower projections of both ends 80a and 80b of the guide block 34 are inserted in the holes 112a and 112b of the two cover plates 30 and 36.

Figure 3B:
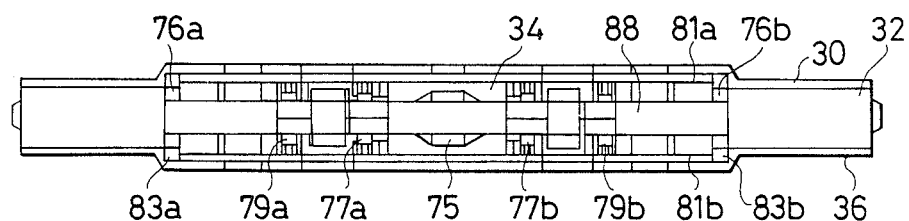
FIG. 3b is a front view of the same.

In other words, it should be noted that the guide block 34 is aligned with the top and the bottom cover plates at the support hole 66, the side tape guide projections 76a and 76b and both ends 80a and 80b, i.e., the guide block 34 is supported by the two cover plates 30 and 36 only at the support hole 66, the side tape guide projections 76a and 76b and both ends 80a and 80b in the XYZ directions in the cassette case. In other words, most of the upper and lower surfaces of the guide block 34 do not contact the inner surfaces of the top and the bottom cover plates 30 and 36, with gaps 81a and 81b formed therebetween as shown in FIG. 3b.

Hence, it is readily understood that, since the guide block 34 is supported at the predetermined points or at quite small areas by the two cover plates 30 and 36, it is very hard to receive the affects of the warps of the top and the bottom cover plates. Thus, the perpendicularity of the tape contact surfaces of the tape guide parts 74a–74d, 76a–76b and 80a–80b with respect to a standard surface such as the flat surfaces of the bulges 40 of the cover plates 30 and 36 can readily be obtained, thereby improving the accuracy of the tape contact guide portions.

In this embodiment, the intermediate frame 32 and the guide block 34 are formed separately, as described above. The intermediate frame 32 may be preferably made of a metallic material such as zinc and aluminum or an alloy of such a metal, and the guide block 34 may be preferably made of a synthetic resin material such as polyacetal, polyamide, polyethylene and ABS.

When assembling the tape cassette, a pair of supply and take-up hubs 90 and 92 on which a magnetic tape 88 is wound are fitted around the collars 86a and 86b of the bottom cover plate 36. Then, the intermediate frame 32 and the guide block 34 are placed on the bottom cover plate 36, and then the top cover plate 30 is put on the intermediate frame 32 and the guide block 34. When the four members are accurately aligned, as described above, screws are inserted into the holes 42a–42e and tightened to align and assemble the four members.

When recording, the magnetic tape 88 supplied from the supply hub 90 passes consecutively the slit 107, the end tape guide projection 80a, a guide roller 98a, the side tape guide projection 76a, the slit 100a, the tape guide parts 74a and 74b, the pressure pad 75 arranged in the center of the head insertion part 78, simultaneously the magnetic head (not shown) of the external tape player/recorder, the tape guides 74c and 74d, the slit 100b, the side tape guide projection 76b, a guide roller 98b, the end tape guide projection 80b and the slit 108, and then is taken up by the take-up hub 92. When reproducing, the recorded tape is once wound back to the hub 90 and then travels in the same way as on recording. In this condition, proper friction is imparted to the magnetic tape 88 from the four tape guide pins 77a, 77b, 79a and 79b of the guide block 34 and the four tape guide projections 76a, 76b, 80a and 80b, and thus no irregular tape run occurs and the tape can travel smoothly. Hence, the unclear sound phenomenon in the frequency modulation or the modulation noise does not happen.

Although the guide block is formed separate from the intermediate frame and thus a four-piece cassette case is assembled in the preferred embodiments of the invention, however, as described above, the guide block of the present invention may be integrally connected to the intermediate frame to obtain a three-piece structure as the tape cassette in U.S. Pat. No. 4,267,986, and further may be applicable to the tape cassette comprising upper and lower half cases and a tape guide, as disclosed in U.S. Pat. No. 4,506,846. Further, the guide block of the invention may be integrally combined with one of the half cases, with the same effects as those of the preferred embodiments described above.

It is readily understood from the above description of the preferred embodiments of the invention that, since the friction may be properly imparted to the running tape, the accuracy of the tape contact portions can be improved. Hence, tape running stability increases and superior contact orientation of the tape in relation to the head is attained. Further, no irregular tape run occurs and the tape can run smoothly along the head. Thus, the unclear sound phenomenon in the frequency modulation or the modulation noise does not happen.

Further, since the cassette case is formed in a four-piece structure according to the present invention, the intermediate frame and the guide block are separately fabricated and hence the intermediate frame and the guide block may exclusively function as a frame and a tape guide respectively. Therefore, both the frame and the guide block will operate very well, to obtain the best combined functioning of the intermediate frame and the guide block, and the most proper materials may be selected. As a result, increases in both the mechanical strength and weight of the case may be readily attained, thereby effectively preventing deformation and warping of the case. In addition, by providing the case with the intermediate frame which will increase its weight, acoustic performance can be remarkably improved.

Although the present invention has been described in its preferred embodiments with reference to the accompanying drawings, it is readily understood that various changes and modifications may be made by those skilled in the art without departing from the spirit and scope of the present invention.

What is claimed is:

1. A magnetic tape cassette comprising:
    a top cover plate, having front, left and right side and rear portions;
    a bottom cover plate, having substantially the same construction as the top cover plate, and having front, left and right side and rear portions;
    an intermediate frame arranged between the tip and the bottom cover plates, having front, left and right side and rear portions corresponding to those of the top and the bottom cover plates; and
    a tape guide block for guiding a tape along an open front of the magnetic tape cassette, which is arranged between the tip and the bottom cover plates at the front portions thereof, and comprising an elongated member having front and rear surfaces and substantially planar upper and lower surfaces which are substantially parallel to each other, and including a head insertion part formed substantially at a center portion of said front surface thereof, a pair of positioning holes formed substantially perpendicularly to said upper and lower surfaces on left and right sides of said head insertion part, first guide member holding means formed near the head insertion part on left and right sides of said positioning holes, second guide member holding means formed far from said head insertion part on left and right sides of said positioning holes, and pairs of first and second guide members to be directly contacted by the magnetic tape and which are held substantially perpendicularly to said upper and lower surfaces of said elongated member by said respective first and second guide member holding means, wherein a coefficient of friction of said first guide members is smaller than that of said second guide members,
    wherein said tape guide block is formed separate from said top and said bottom cover plates and said intermediate frame, and wherein said tape guide block is made of a synthetic resin material and said intermediate frame is made of a metallic material.

2. A tape cassette as defined in claim 1, wherein said front portion of said intermediate frame is partially cut out, and said tape guide block is arranged in the cutout front portion of said intermediate frame, and wherein said tape guide block is aligned with said tip and said bottom cover plates by aligning means.

3. A tape cassette as defined in claim 1, wherein said first and said second guide member holding means each comprise a pair of upper and lower bifurcated guide projections formed on said front surface of said tape guide block.

4. A tape cassette as defined in claim 3, wherein each first guide member comprises a pin made of a metallic material and each second guide member comprises a pin made of a synthetic resin material.

5. A tape cassette as defined in claim 1, wherein the top and the bottom cover plates are each in the form of a substantially flat plate.

* * * * *